United States Patent
Malegaonkar et al.

(10) Patent No.: US 11,068,705 B2
(45) Date of Patent: Jul. 20, 2021

(54) VECTOR BASED OBJECT RECOGNITION IN HYBRID CLOUD

(71) Applicant: Cisco Technology, Inc., San Jose, CA (US)

(72) Inventors: Ashutosh Arwind Malegaonkar, Milpitas, CA (US); Haihua Xiao, Shanghai (CN); Rizhi Chen, Shanghai (CN); Li Kang, Shanghai (CN); Siqi Ling, Shanghai (CN); Mingen Zheng, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 176 days.

(21) Appl. No.: 16/193,238

(22) Filed: Nov. 16, 2018

(65) Prior Publication Data

US 2019/0377939 A1 Dec. 12, 2019

Related U.S. Application Data

(60) Provisional application No. 62/683,202, filed on Jun. 11, 2018.

(51) Int. Cl.
*G06K 9/00* (2006.01)
*G06K 9/62* (2006.01)
(Continued)

(52) U.S. Cl.
CPC ....... *G06K 9/00362* (2013.01); *G06F 16/583* (2019.01); *G06K 9/00718* (2013.01); *G06K 9/6255* (2013.01); *G06Q 30/0201* (2013.01)

(58) Field of Classification Search
CPC .......... G06K 9/00362; G06K 9/00221; G06K 9/6255; G06K 9/00711; G06K 9/00718;
(Continued)

(56) References Cited

U.S. PATENT DOCUMENTS 9,456,131 B2 9/2016 Tran
9,736,349 B2 8/2017 Yang et al.
(Continued)

OTHER PUBLICATIONS

International Search Report and Written Opinion from the International Searching Authority, dated Sep. 19, 2019, 12 pages, for corresponding International Patent Application No. PCT/US2019/035729.

(Continued)

*Primary Examiner* — Siamak Harandi
(74) *Attorney, Agent, or Firm* — Polsinelli PC

(57) ABSTRACT

Disclosed are systems, methods, and computer-readable media for a hybrid cloud structure for machine-learning based object recognition. In one aspect, a system includes one or more video-capable access points; and one or more processors configured to receive image data from the one or more video-capable access points; perform, at a first processor of the one or more processors, a first process to detect one or more objects of interest in the image data; generate vector IDs for one or more objects detected in the image data; perform, at a second processor of the one or more processors, a second process to identify the one or more objects in the vector IDs; and generate at least one offline trail for the one or more objects based on statistics associated with the one or more objects identified.

20 Claims, 8 Drawing Sheets

(51) Int. Cl.
*G06Q 30/02* (2012.01)
*G06F 16/583* (2019.01)

(58) Field of Classification Search
CPC . G06K 9/6201; G06Q 30/0201; G06F 16/583
USPC .......................................................... 382/103
See application file for complete search history.

(56) References Cited

U.S. PATENT DOCUMENTS

| | | | |
|---|---|---|---|
| 10,559,202 B2* | 2/2020 | Yang et al. ........ | G06K 9/00771 |
| 2007/0296817 A1 | 12/2007 | Ebrahimi et al. | |
| 2009/0059007 A1* | 5/2009 | Wagg et al. ....... | G06K 9/00369 348/157 |
| 2011/0090344 A1 | 4/2011 | Gefen et al. | |
| 2018/0337994 A1* | 11/2018 | Dachille ............. | H04L 67/1097 |

OTHER PUBLICATIONS

Chen, Ning, et al., "Poster Abstract: Smart Urban Surveillance Using Fog Computing," 2016 IEEE/ACM Symposium on Edge Computing, Oct. 27, 2016, pp. 95-96.

Zhang, Wenyu, et al., "Cooperative Fog Computing for Dealing with Big Data in the Internet of Vehicles: Architecture and Hierarchical Resource Management," Emerging Trends, Issues, and Challenges in Big Data and Its Implementation Toward Future Smart Cities, IEEE Communications Magazine, Dec. 31, 2017, pp. 60-67.

"VoCord Face Control: Facial Recognition Systems in Retail," www.vocord.com, pp. 1-20.

"FacePro: Panasonic Deep Learning Facial Recognition System," Panasonic Corporation 2015-2018, pp. 1-8.

* cited by examiner

VECTOR BASED OBJECT RECOGNITION IN HYBRID CLOUD

RELATED APPLICATION DATA

This application claims priority to U.S. Provisional Application 62/683,202 filed on Jun. 11, 2018, the entire content of which is incorporated herein by reference.

TECHNICAL FIELD

The present technology pertains to vector based object recognition and more specifically to a hybrid cloud structure for machine-learning based object recognition.

BACKGROUND

With the advancement of technology and the ever expansion of online commerce, many techniques have been developed for tracking online movement and activity of users (users' online trails) in order to learn their behavior, provide targeted advertising, etc. Applying the same concept to physical locations in order to track a user's movement and activity within or through one or more physical locations (the user's offline trail) has many limitations. For example, detecting a customer's movement throughout a store requires (1) having sufficient number of access points/beacons installed within a store and (2) and the customer carrying mobile devices capable of communicating with the installed access points. Furthermore, available face recognition based methods are inadequate as they are computationally intensive due to the large amount of data to be processed and also their inability to identify different instances/captured images of users in different poses, outfits, etc. and use them for creating the user's offline trail.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
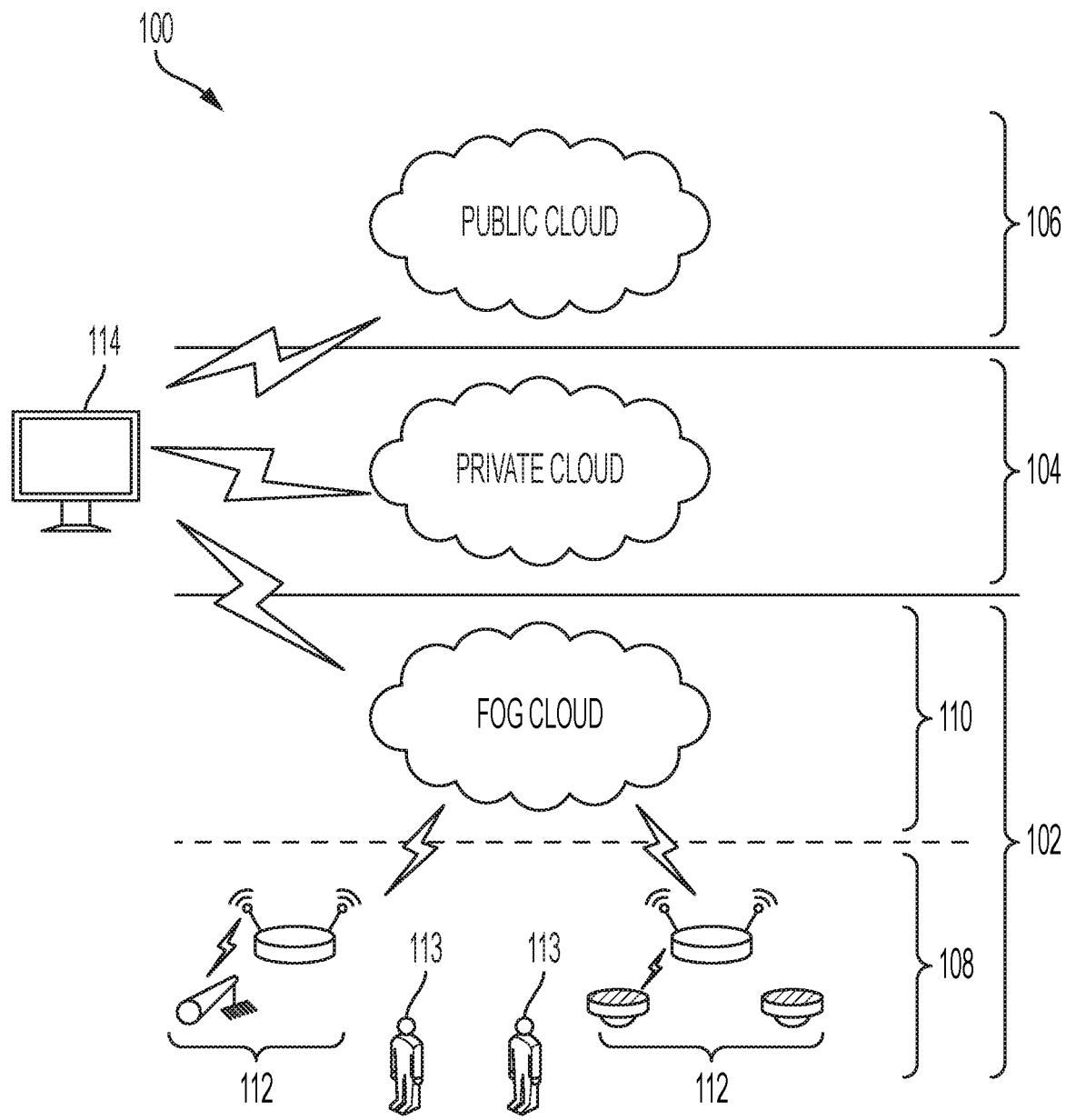
FIG. 1 illustrates an example hybrid cloud architecture for image recognition, according to one aspect of the present disclosure.

Various example embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

An Execution Endpoint (EE) can include a compute-capable system that can run functions. Non-limiting examples can include computers, laptops, IoT devices, servers, switches, mobile phones, kiosks, workstations, etc. EEs can be registered in the Function Router for use in executing functions. Execution endpoints can run various FaaS runtime environments and services.

A client can include a device and/or application seeking to execute a function on an Execution Endpoint. Non-limiting examples of a client can include a robot arm, mobile phone, hand scanner, application, printer, kiosk, etc.

A function can include a piece of code. The piece of code can represent, for example, an ephemeral, self-contained set of business logic. Serverless functions can be compared to stored procedures in that they do a specific thing, and are called and executed when needed, only to go back to being dormant (but ready) when execution completes.

A location can include a physical location (e.g., a building, a floor, etc.) and/or a logical location. A location can be associated with specific latitude and longitude coordinates. For example, a location can refer to specific latitude and longitude coordinates corresponding to the manufacturing floor where a robot resides or a conference room where an FaaS device is plugged in, or a region associated with an environment.

Function routing rules can include policies and controls around who, what, when, where, why, and/or how for function execution. The rules can include IT-defined guardrails that affect the entire system, and other rules specified by IT or a development team for a specific function. Example rules can include: Function A can run on any endpoint but Function B must only run on a private endpoint; or Function A can be called by any client in a specific location, but function B can only be called by specific clients in any location.

OVERVIEW

Disclosed are systems, methods, and computer-readable media for a hybrid cloud structure that provides a machine-learning based object recognition to create offline trails for users and consumers.

In one aspect of the present disclosure, a system includes one or more video-capable access points; and one or more processors configured to receive image data from the one or more video-capable access points; perform, at a first processor of the one or more processors, a first process to detect one or more objects of interest in the image data; generate vector IDs for one or more objects detected in the image data; perform, at a second processor of the one or more processors, a second process to identify the one or more objects in the vector IDs; and generate at least one offline trail for the one or more objects based on statistics associated with the one or more objects identified In one aspect, a method includes receiving image data from one or more video-capable access points; performing, at a first processor, a first process to detect one or more objects of interest in the image data; generating vector IDs for one or more objects detected in the image data; sending the vector IDs to a second processor; performing, at the second processor, a second process to identify the one or more objects in the vector IDs; and generating an offline trail for the one or more objects based on statistics associated with the one or more objects identified.

In one aspect, one or more non-transitory computer-readable medium have computer-readable instructions, which when executed by one or more processors, cause the one or more processors to receive image data from one or more video-capable access points; perform, at a first processor, a detection process to detect one or more objects of interest in the image data; generate vector IDs for one or more objects detected in the image data; send the vector IDs to a second processor; perform, at the second processor, a recognition process to identify the one or more objects in the vector IDs; and generate an offline trail for the one or more objects based on statistics associated with the one or more objects identified.

DETAILED DESCRIPTION

The disclosed technology addresses the need in the art for an efficient image recognition process that can be used to track an object's or an individual's offline trail as the object or the individual moves through one or more physical locations and/or various sections thereof.

The disclosure begins with a description of example network architecture. FIG. 1 illustrates example hybrid cloud architecture for image recognition, according to one aspect of the present disclosure.

FIG. 1 shows an example hybrid cloud system 100 that includes three layers. The layers include a fog layer 102, a private platform layer 104 and a public platform layer 106.

Fog layer 102 can include two sub-layers 108 and 110. Sub-layer 108 can include one or more access points such as access point (APs) 112. Access points 112 can have capabilities for capturing video and image data of objects and individuals such as individual 113 in its field of view (FOV) and can provide camera services. While individuals 113 are used hereinafter as an example, inventive concepts are not limited to individuals and persons but can also include any other type of moving object, animal, etc. In one example, each of the individuals 113 may have a shopping and/or a mobile device associated therewith.

In another example, the video-capable access points 112 may be coupled to mobile cameras that may for example be attached to a cart being carried by individual 113 when individual 113 visits a merchant site or a particular location. This may provide various types of metadata (e.g., types of products selected for purchases, types of products reviewed but not selected, etc.) that can be associated with individual 113 that can convey an improved and more accurate offline trail of the individual 113.

There may be more than one object/individual in a FOV of access point 112 at the time an image/video data is captured. Access point 112 can be any known or to be developed IP based video/image capturing device such as access points by Cisco, Inc. of San Jose, Calif., that have video/image capturing capabilities. These video-capable access points may hereinafter be referred to as simply access points.

Access points 112 may be installed throughout a physical location or premise (e.g., a department store, a shopping mall, a stadium, a library, a university campus, etc.) that can continuously (or at scheduled time intervals) capture image and video data of objects in its FOV.

Sub-layer 110 can be a fog/edge service that includes one or more servers (which can be any known or to be developed server by, for example, Cisco Technology, Inc. of San Jose, Calif.), that can perform a detection process (a face detection process) on video and image data captured by access point 112 in the sub-layer 108. A non-limiting example of such fog servers is Raspberry Pi device/server. Alternatively, the detection process performed by fog servers may be performed at the private platform layer 104, as will be discussed below. Example structure and components of a fog server will be described with reference to FIG. 2.

Private platform layer 104 can be a private cloud that includes one or more servers providing container based services and may be located at or in geographical proximity of the premise in which the components of fog layer 102 are installed (e.g., within the same confined physical space/building, within a threshold physical distance such as a few hundred feet or a few miles) or in the alternative may be remotely located therefrom but communicatively coupled thereto. The private platform layer 104 may be a platform developed by Cisco Technology, Inc. of San Jose, Calif. and thus may be referred to as a Cisco Container Platform (CCP) 104. Private platform layer 104 can be an infrastructure as a server (IaaS) with one or more servers that allow for automatic deployment, scaling and management of container-based applications, one or more storage facilities, etc., as will be described below. The one or more servers of private platform layer 104 may be one or more server nodes (e.g., Kubernetes (K8s) nodes) that may be managed by other ones of the server nodes (e.g., K8 master nodes). Private platform layer 104 can also include any other component necessary for operation thereof including, but not limited to, image processing and face detection algorithms, components for establishing communications with other components of system 100 such as components in fog layer 102 or public platform layer 106, etc. Example structure and components of private platform layer 104 will be described with reference to FIG. 2.

Public platform layer 106 can be a third party cloud platform provided by a third party and thus may be referred to as an External Cloud Platform (ECP) 106. Public platform layer 106 can be a public, private or a hybrid cloud platform. Alternatively, public platform layer 106 may be provided by the same entity that provides private platform layer 104 (e.g., Cisco Technology, Inc. of San Jose, Calif.).

There may be a secure communication channel between private platform layer 104 and public platform layer 106 through which various services provided by components/services at private platform layer 104 may call up services and functionalities provided at public platform layer 106. Furthermore, offline trails of individuals and objects may be accessed by logging into the system 100 via terminal 114, as will be described below. Terminal 114 can be any known or to be developed computer device capable of establishing a connection to servers at various levels of the system 100 including, but not limited to, a mobile device, a laptop, a desktop, a tablet, etc. Terminal 114 can be communicatively coupled to components at public platform layer 106, private platform layer 104 and/or fog layer 102.

Figure 2:
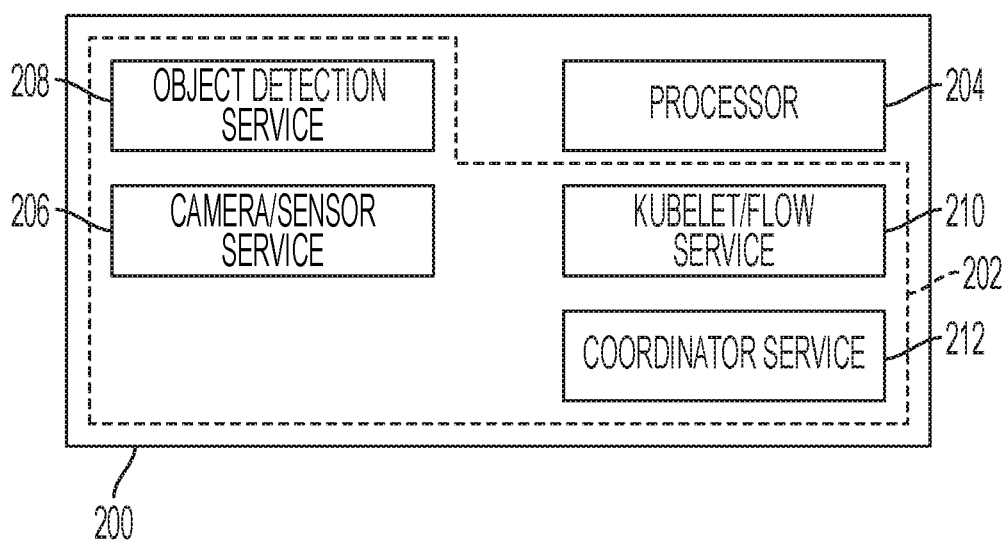
FIG. 2 illustrates components of a fog server at fog layer of FIG. 1, according to one aspect of the present disclosure.

FIG. 2 illustrates components of a fog server at fog layer of FIG. 1, according to one aspect of the present disclosure.

Fog server 200 can be physical or virtual network node (e.g., a kubelet node) with one or more memories such as memory 202 and one or more processors such as processor 204 (which together may provide a hosting/docket environment). Memory 202 can have one or more services installed thereon, which when executed by processor 204, execute their corresponding functionalities. For example, memory 202 can include a camera/sensor service 206, an object detection service 208, a flow service 210 and a coordinator service 212.

Camera/sensor service 206, when executed by processor 204, can manage, control and update sensors and access points 112. Fog server 200 is communicatively coupled to each access point 112 and associated image capturing cameras and sensors and may continuously receive captured image and video data from access points 112.

Object detection service 208, when executed by processor 204, can perform any known or to be developed operation on received image and video data to detect one or more objects of interest in the received data, as will be described below. The information extracted from the received video and image data by processor 204 can include face information of individual 113, position of objects included in the captured image of individual 113, various metadata associated with individual 113 including, but not limited to, time of day, GPS location of the premise, products/items selected by individual 113, activities engaged in by the individual 113 while at the premise in which the access point 112 is installed, etc. This extracted information may then be transmitted as a vector of numbers to severs at private platform layer 104 for further processing, as will be described below.

Flow service 210, when executed by processor 204, manages operations and communication of network nodes within system 100. For example, flow service 210 can be a Kubelet flow service that manages interoperability of kubelet nodes, as is known in the art.

Coordinator service 212, when executed by processor 204, may manage and coordinate exchange of information between different layers of the hybrid structure of system 100 for performing different image processing and recognition functions, as will be described below.

Figure 3:
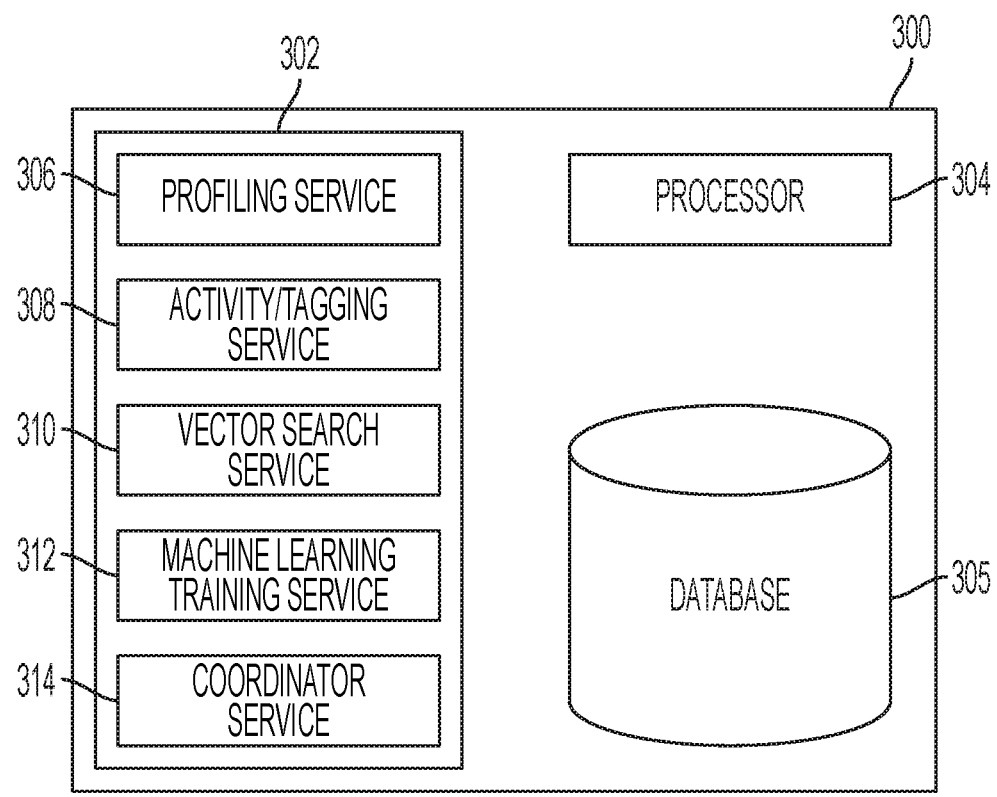
FIG. 3 illustrates components of a server at private platform layer of FIG. 1, according to one aspect of the present disclosure.

FIG. 3 illustrates components of a server at private platform layer of FIG. 1, according to one aspect of the present disclosure.

Server 300 can be physical or virtual network node (e.g., a kubelet node) with one or more memories such as memory 302, one or more processors such as processor 304 and one or more databases 305. In case of a virtual network node, server 300 may be implemented on a hyperflex, which can combine software-defined storage and data services software with a unified computing system to provide a converged infrastructure system that integrates computing, networking and storage resources to increase efficiency and enable centralized management of system 100.

Memory 302 can have one or more services installed thereon, which when executed by processor 304, execute their corresponding functionalities. For example, memory 302 can include a profiling service 306, an activity/tagging service 308, a vector search service 310, a machine learning training service 312 and a coordinator service 314.

Activity/tagging service 308, when executed by processor 304, may correlate vector IDs (received from server 200 after performing a face detection process on video or image data captured by access points 112) as having a threshold amount of similarity therebetween without associating the vectors with a given user ID. For example, if the recognition process is performed on the same face of individual 113 with slight variations (e.g., variations in angles, facial expressions, glasses, etc.), the tagging service 308 can be implemented to determine that the two different vectors are close enough to both belong to the same person. This process may be referred to as a user ID independent vector correlation, which is one novel advantage of the hybrid architecture of system 100. Because the vectors are "anonymously" transmitted to server 300 and tagged as being similar, an unauthorized access to these vectors cannot reveal the true identity of the user with whom the vectors are associated and thus protects the privacy and security of the corresponding user's identity.

Profiling service 306, when executed by processor 304, may establish a link or associate such vector IDs to a given user ID. For example, individual 113 may have a profile established with the system 100 that also includes a picture (picture ID) thereof or individual 113 may log into system 100 via terminal 114. An image of individual 113 taken at login or one that may already be stored in association with the profile of individual 113 may be used to associate the correlated vector IDs to the user ID and store the result in database 305.

Vector search service 310, when executed by processor 304, may perform any known or to be developed image recognition process of vectors of numbers that represent detected images received after the image detection process performed by fog server 200. The vector search for image recognition will be further described below.

Machine learning training service 312 may be a classifier that continuously receives various data related to objects and individuals either from terminal 114 or public platform layer 106 and develops a machine learning based model that is used by vector search service to recognize images of interest in data received from fog server(S) 200. The training of such classifier may be based on any known or to be developed machine learning process.

In another example, machine learning training service 312 can generate new data (e.g., multiple different poses of an individual from a single photo of the same individual received via terminal 114 or public platform layer 106, as will be described below).

Coordinator service 314, when executed by processor 304, may manage and coordinate exchange of information between different layers of the hybrid structure of system 100 for performing different image processing and recognition functions, as will be described below. Coordinator service 314 may communicate or be in synch with coordinator service 212 of fog server 200.

Figure 4:
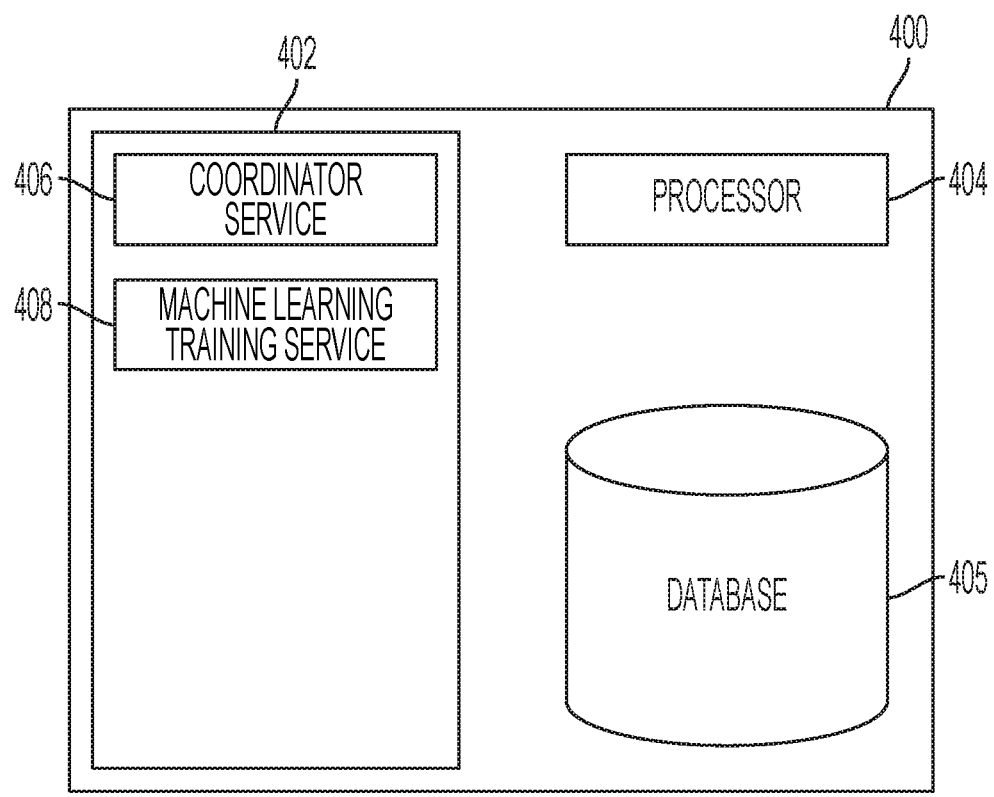
FIG. 4 illustrates components of a server at public platform layer of FIG. 1, according to one aspect of the present disclosure

FIG. 4 illustrates components of a server at public platform layer of FIG. 1, according to one aspect of the present disclosure.

Server 400 can be physical or virtual network node (e.g., a kubelet node) with one or more memories such as memory 402, one or more processors such as processor 404 and one or more databases 405.

Memory 402 can have one or more services installed thereon, which when executed by processor 404, execute their corresponding functionalities. For example, memory 402 can include a coordinator service 406 and a machine learning training service 408.

Coordinator service 406, when executed by processor 404, may manage and coordinate exchange of information between different layers of the hybrid structure of system 100 for performing different image processing and recognition functions, as will be described below. Coordinator service 406 may communicate or be in synch with coordinator service 314 of server 300 and/or coordinator service 212 of fog server 200.

Machine learning training service 408 may be the same as machine learning training service 312 of server 300 described above or may work in coordination with machine learning training service 312 to train a model set for server 300 to be used when performing a vector search on vectors of data received from fog server 200 for detecting faces and performing image recognition.

Database 405 may be one or a collection of public, private and/or hybrid databases that collect and store information on users and objects. For example, database 405 may include various different images of an individual that are available on the internet, various social media websites, etc. via public cloud layer 106 (e.g., Google database, Facebook, which may be referred to as a public cloud platform). Machine learning training service 408 may retrieve these different images and correlate them or use them to train a model set on server 300, which can be used to better and more accurately detect images of users.

Having described various components of an example hybrid cloud structure for image detection and recognition, hereinafter example methods implemented by such hybrid cloud structure will be described.

Figure 5:
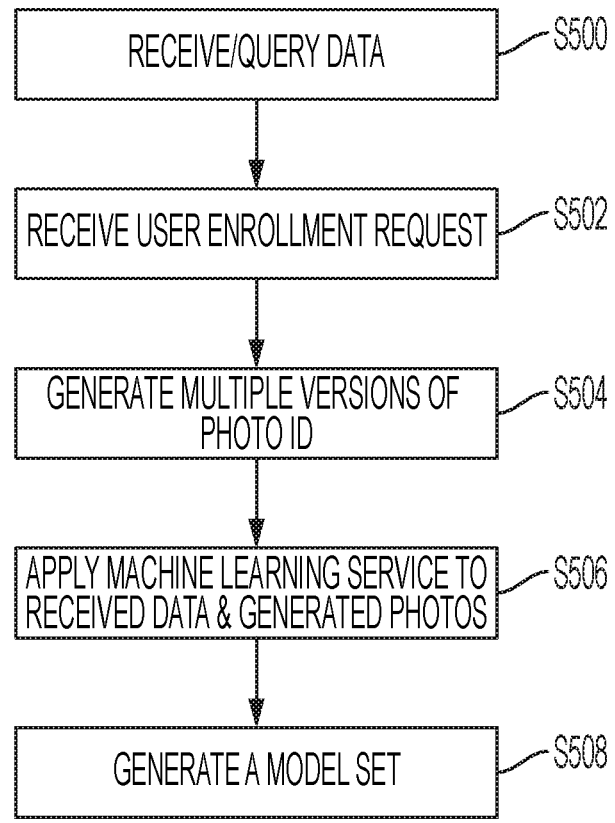
FIG. 5 illustrates an example method of developing machine-learning based models for object recognition, according to one aspect of the present disclosure.

FIG. 5 illustrates an example method of developing machine-learning based models for object recognition, according to one aspect of the present disclosure. FIG. 5 will be described from perspective of server 300. However, it will be understood that one or more processors such as processor 304 of server 300 implement one or more services stored on memory 302 of server 300 to perform functions described with reference to FIG. 5.

At S500, server 300 may receive data from public platform layer 106 or server 400 thereof. The received data can include various types of information about users, their associated identifications, activities and information, captured images, etc. Alternatively, at S500, server 300 may query server 400 for such information. The query may be in response to execution of vector search service 310 executed by processor 304. In another example, data received at S500 may be output of machine learning training service 408, in the form of a dataset, which can be stored by server 300 in database 405 for vector based face recognition, as will be described below.

At S502, which can be simultaneous with, prior to or after step S500, server 300 may receive a user enrollment request. Such request may be received via a user interface (UI) on terminal 114. The user enrollment request may be a request by a user using terminal 114. The user may provide or register for a corresponding user identification (ID) request. Together with such request, the user may also provide a photo ID.

At S504 and upon receiving the user ID and photo ID, server 300 may generate multiple different versions of the photo ID (which may also be referred to as a reference image). Each such version may be generated by, for example, rotating the photo ID a specific angle (e.g., by 15 degrees), applying Gaussian noise to the photo ID or each rotated version thereof and/or flit the photo ID horizontally or vertically. Accordingly, multiple different versions and photo IDs of the user may be generated, which can in turn be used to better train a model set developed by executing the machine learning training service 312.

At S506, server 300 may execute the machine learning training service 312 to data received at S500 and/or photo IDs received and generated at S502 and S504. In one example, the machine learning training service may extract various features and characteristics of the received data and photo IDs, correlate them and store them in a database such as database 305. In one example, each user ID may have a designated photo ID and multiple other photos associated therewith. The multiple additional photos may be referred to as life photos to indicate that the additional photos are collected and provided over time at different instances and belong to the same user.

At S508 and based on the machine learning training at S506, server 300 generates a model set. The extracted features together with a corresponding user identification information may be stored as a dataset of numbers to be used for vector based search for face recognition, as will be described below.

Figure 6:
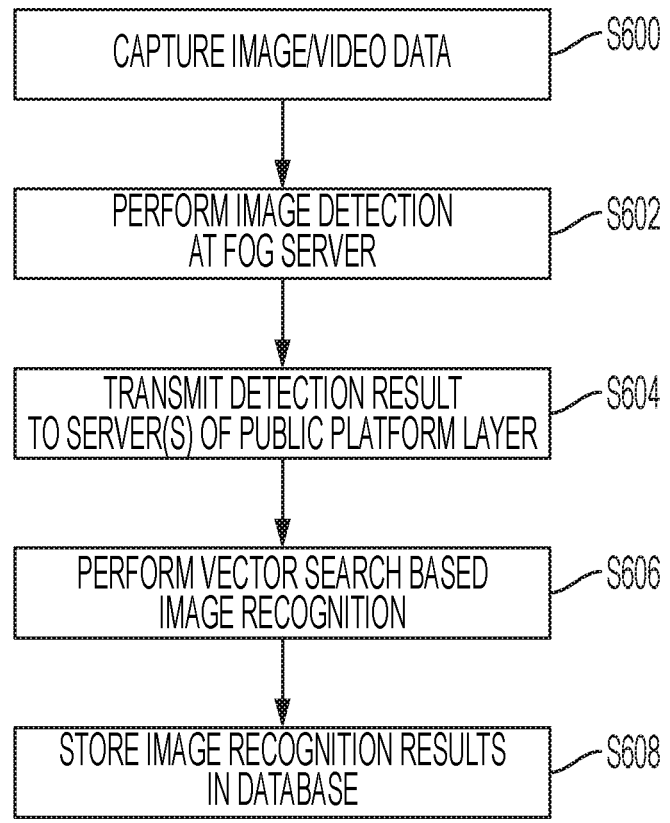
FIG. 6 illustrates an example image detection and recognition method, according to one aspect of the present disclosure.

Accordingly, by implementing the process of FIG. 5, either continuously or at set intervals, server 300 develops a model set that can be used in the process of FIG. 6 to receive face detection results from fog server 200, perform an efficient and secure process for image recognition to identify objects and users.

FIG. 6 illustrates an example image detection and recognition method, according to one aspect of the present disclosure. FIG. 6 will be described from perspective of fog server 200 and server 300. However, it will be understood that one or more processors such as processor 204 of fog server 200 and processor 304 of server 300 implement one or more services stored on respective one of memories 202 and 302 memory 302 to perform functions described with reference to FIG. 6.

At S600 image and/or video data of objects or individuals such as individual 113 may be captured by one or more access points such as access point(s) 112, as described above. In one example, capturing of image and/or video data may be performed continuously.

At S602, fog server 200 performs a detection process on the image and/video data captured by access point(s) 112 at S600. In one example, server 200 may perform the detection process to detect objects of interests (e.g., human faces) using a modified version of Multi-Task Cascaded Convolution Neural Networks (MTCNN). As is known, MTCNN has three outputs, namely, face classification confidence, face location and face landmarks. According to the modified version, a fourth output is added that is indicative of the sharpness information of detected faces in order to distinguish between a blurred and a sharp face detected in the image. In one example, classifying an image or a detected face into a blurred or a sharp image, is a classification problem, which can be solved using a cross entropy loss according to the formula provided below:

$$L_i^{sh} = (-y_i^{sh} \log(p_i) + (1-y_i^{sh})(1-\log(p_i))$$

where i represent the $i^{th}$ example in the training dataset, $y^i \in \{0, 1\}$, denotes the ground truth label, and $p_i$ is the probability of a neural network denoting the sharpness of the detected face.

At S604, server 200 transmits the detection results to server 300 as vectors of numbers. Accordingly, when multiple cameras or access points 112 capture different images of multiple users or of the same user, each detected instance is transmitted as an independent vector of numbers to server 300 without being correlated to a specific user ID, which is a process being performed by server 300, as will be described below.

At S606, server 300 performs an image recognition process on vectors of numbers received from server 200 to identify users. In one example, server 300 executes vector search service 310 using a model set that is developed according to process of FIG. 5, as described above. Accordingly, vector ID(s) are associated with a user ID or a photo ID stored in database 305. An example algorithm used for such vector search is Approximate Nearest Neighbor Search, which involves determining a Euclidean distance between two vectors to determine similarities between them.

At S608, the generated vector ID(s) (recognition results) are stored in association with corresponding user ID(s) in a database (e.g., database 305) along with metadata thereof corresponding to various statistics.

As more and more images of individual 113 are captured, processed, identified and stored per the process of FIGS. 5 and 6, an offline trail of an individual may be created, which can be used to study and tracking individual 113's habits (shopping habits, located visited, finer details of individual 113's movement within a visited location, etc.)

Figure 7:
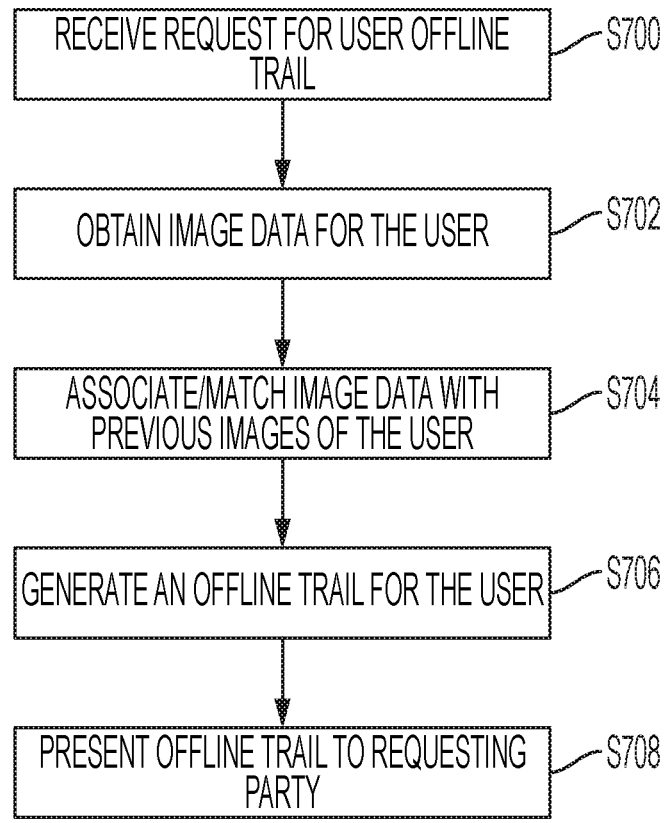
FIG. 7 illustrates an example method of creating and retrieving offline trail of individuals, according to one aspect of the present disclosure.

FIG. 7 illustrates an example method of creating and retrieving offline trail of individuals, according to one aspect of the present disclosure. FIG. 7 will be described from perspective of server 300. However, it will be understood that one or more processors such as processor 304 of server 300 implement one or more services stored on memory 302 of server 300 to perform functions described with reference to FIG. 7.

At S700, a request for a user offline trail is received. The request may be one from an individual such as individual 113 as described above, where individual 113 wants to view his or her own offline trail (e.g., via terminal 114). Alternatively, the request may be from a network operator or an operator of a premise in which system 100 is used (in which access points 112 and/or server(s) 200 and server(s) 300 are installed).

At S702 an image data of a user for whom the user offline trail request is received, is obtained (where the requesting party is the individual 113). The image may be a previously recorded profile image or a newly provided image.

At S704, image data of S702 are associated/matched with previous images of detected instances of the same user (stored as vector IDs stored in database(s) 305. In doing so, first a vector ID is generated for the image data of S702 in a similar manner as described above by performing detection and recognition processes. Thereafter, a vector based search (e.g., using indexes) are performed to find matches among stored vector IDs (matched vector IDs) for the vector ID associated with image data of S702.

Thereafter, at S706, an offline trail is generated. In doing so, statistics associated with matched vector IDs are retrieved (e.g., from database 305) and compiled into a report, a format of which may be as requested by the requesting party, be in a tabular form, etc.

At S708, the offline trail is sent (communicated) to the requesting party.

In one example, the requesting party from which the request is received at S700 may not be the individual himself but may rather be an operator or manager of a premise or premises utilizing system 100. Accordingly, S702 and S704 may not be performed as described above but rather various levels of statistics regarding patrons and individuals detected at the underlying premises may be collected and retrieved as described above.

Having described various examples of using components and methods implemented by components of a hybrid cloud structure for face detection and recognition, example system components that can be implemented as one or more of servers 200, 300 and/or 400.

Figure 8:
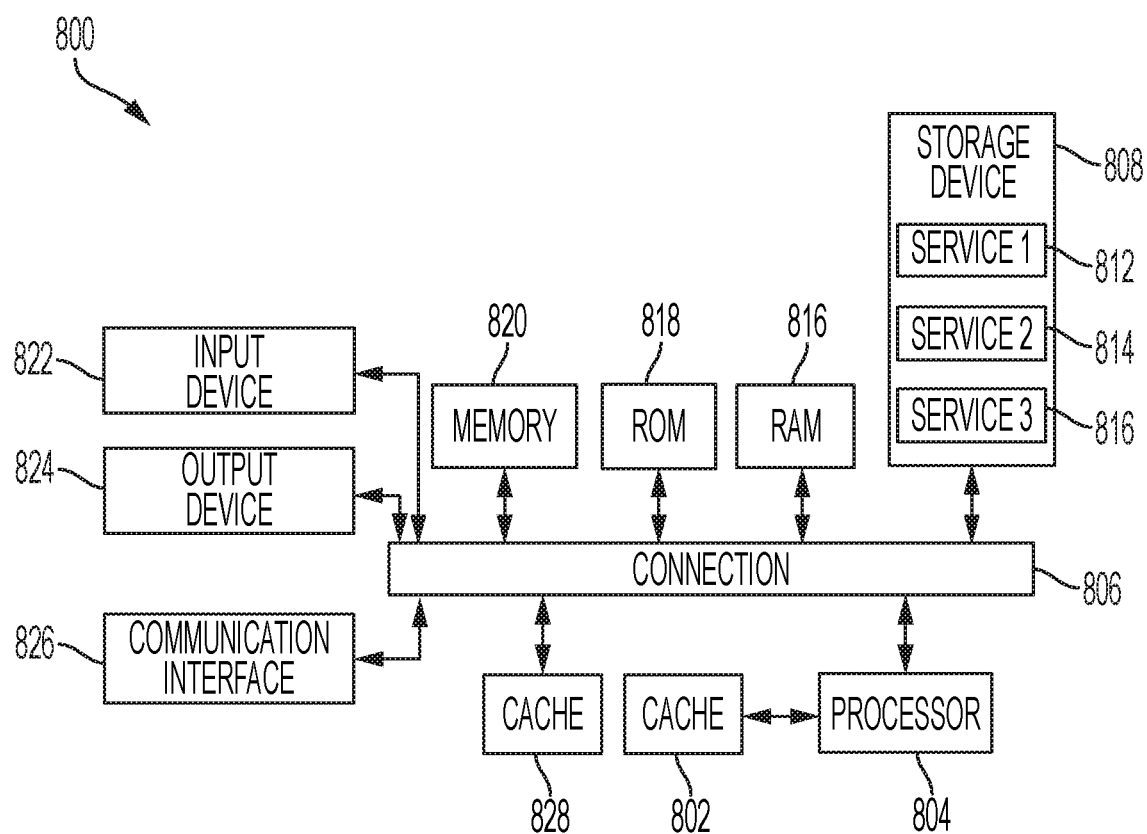
FIG. 8 illustrates an example system including various hardware computing components, according to an aspect of the present disclosure.

FIG. 8 illustrates an example system including various hardware computing components, according to an aspect of the present disclosure. The more appropriate embodiment will be apparent to those of ordinary skill in the art when practicing the present technology. Persons of ordinary skill in the art will also readily appreciate that other system embodiments are possible.

FIG. 8 illustrates system architecture 800 wherein the components of the system are in electrical communication with each other using a connection 806. Exemplary system 800 includes a processing unit (CPU or processor) 804 and a system connection 806 that couples various system components including the system memory 820, such as read only memory (ROM) 818 and random access memory (RAM) 816, to the processor 804. The system 800 can include a cache of high-speed memory connected directly with, in close proximity to, or integrated as part of the processor 804. The system 800 can copy data from the memory 820 and/or the storage device 808 to the cache 802 for quick access by the processor 804. In this way, the cache can provide a performance boost that avoids processor 804 delays while waiting for data. These and other modules can control or be configured to control the processor 804 to perform various actions. Other system memory 820 may be available for use as well. The memory 820 can include multiple different types of memory with different performance characteristics. The processor 804 can include any general purpose processor and a service component, such as service 1 810, service 2 812, and service 3 814 stored in storage device 808, configured to control the processor 804 as well as a special-purpose processor where software instructions are incorporated into the actual processor design. The processor 804 may essentially be a completely self-contained computing system, containing multiple cores or processors, a bus, memory controller, cache, etc. A multi-core processor may be symmetric or asymmetric.

To enable user interaction with the system 800, an input device 822 can represent any number of input mechanisms, such as a microphone for speech, a touch-sensitive screen for gesture or graphical input, keyboard, mouse, motion input, speech and so forth. An output device 824 can also be one or more of a number of output mechanisms known to those of skill in the art. In some instances, multimodal systems can enable a user to provide multiple types of input to communicate with the system 800. The communications interface 826 can generally govern and manage the user input and system output. There is no restriction on operating on any particular hardware arrangement and therefore the basic features here may easily be substituted for improved hardware or firmware arrangements as they are developed.

Storage device 808 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 816, read only memory (ROM) 818, and hybrids thereof.

The system 800 can include an integrated circuit 828, such as an application-specific integrated circuit (ASIC) configured to perform various operations. The integrated circuit 828 can be coupled with the connection 806 in order to communicate with other components in the system 800.

The storage device 808 can include software services 810, 812, 814 for controlling the processor 804. Other hardware or software modules are contemplated. The storage device 808 can be connected to the system connection 806. In one aspect, a hardware module that performs a particular function can include the software component stored in a computer-readable medium in connection with the necessary hardware components, such as the processor 804, connection 806, output device 824, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:
1. A system comprising:
   one or more video-capable access points; and
   one or more processors configured to:
      receive image data from the one or more video-capable access points;

detect, via a first processor of the one or more processors, one or more objects of interest in the image data, the first processor being at a first layer of a hybrid cloud system;
transmit a plurality of vectors of numbers to a second processor of the one or more processors, each of the plurality of vectors of numbers representing a respective object of the one or more objects detected;
identify, via the second processor of the one or more processors, the one or more objects using the plurality of vectors of numbers, wherein the second processor is at a second layer of the hybrid cloud system, and wherein the second processor implements a model trained to identify objects from vectors of numbers, the model being trained at least partly using multiple images that are generated from an image of an object and that depict the object in the image in different poses; and
generate at least one offline trail for the one or more objects based on statistics associated with the one or more objects identified.

2. The system of claim 1, wherein the one or more objects are individuals.

3. The system of claim 1, wherein the first layer is a fog layer of a hybrid cloud architecture associated with the hybrid cloud system.

4. The system of claim 3, wherein the second processor is located in physical proximity of the first processor and the one or more video-capable access points and forms a private platform layer of the hybrid cloud architecture.

5. The system of claim 1, wherein the model is trained to perform a vector based search of a database to identify the one or more objects.

6. The system of claim 5, wherein the model comprises a machine learning based model.

7. The system of claim 6, wherein the second processor is configured to create the machine learning based model using image data retrieved from a cloud platform and one or more computer generated versions of the image of the one or more objects, wherein the one or more computer generated versions of the image comprise the multiple images that are generated from the image.

8. The system of claim 1, wherein the second processor is configured to:
receive a reference image;
at least one of rotate or flip the reference image to generate corresponding computer generated versions of the reference image, the corresponding computer generated versions of the reference image comprising different versions of the reference image having different orientations than the reference image; and
train the model using the corresponding computer generated version of the reference image.

9. A method comprising:
receiving image data from one or more video-capable devices;
detecting, via a first processor, one or more objects of interest in the image data, the first processor being at a first layer of a hybrid cloud system;
transmitting a plurality of vectors of numbers to a second processor of the one or more processors, each of the plurality of vectors of numbers representing a respective object of the one or more objects detected;
identifying, via the second processor, the one or more objects using the plurality of vectors of numbers, wherein the second processor is at a second layer of the hybrid cloud system, and wherein the second processor implements a model trained to identify objects from vectors of numbers, the model being trained at least partly using multiple images that are generated from an image of an object and that depict the object in the image in different poses; and
generating an offline trail for the one or more objects based on statistics associated with the one or more objects identified.

10. The method of claim 9, wherein the one or more objects includes at least one individual.

11. The method of claim 9, further comprising:
receiving a request for the offline trail from at least one requesting party, wherein the offline trail indicates a history of an individual's visited locations and shopping habits.

12. The method of claim 9, wherein the one or more objects comprise one or more individuals, and wherein identifying the one or more objects comprises recognizing and identifying the one or more individuals.

13. The method of claim 9, wherein the model is trained to perform a vector based search of a database for identifying the one or more objects.

14. The method of claim 13, wherein the model comprises a machine learning model and the vector based search uses a machine learning based dataset.

15. The method of claim 14, further comprising:
creating the machine learning model using one or more computer generated versions of the image of the one or more objects, the one or more computer generated version of the image comprising the multiple images generated from the image.

16. The method of claim 9, further comprising:
receiving as reference image; and
generating corresponding computer generated versions of the reference image by at least one of rotating or flipping the reference image.

17. At least one non-transitory computer-readable medium comprising computer-readable instructions, which when executed by one or more processors, cause the one or more processors to:
receive image data from one or more video-capable access points;
detect, via a first processor, one or more objects of interest in the image data, the first processor being at a first layer of a hybrid cloud system;
transmit a plurality of vectors of numbers to a second processor of the one or more processors, each of the plurality of vectors of numbers representing a respective object of the one or more objects detected;
identify, via the second processor, the one or more objects using the plurality of vectors of numbers, wherein the second processor is at a second layer of the hybrid cloud system, and wherein the second processor implements a model trained to identify objects from vectors of numbers, the model being trained at least partly using multiple images that are generated from an image of an object and that depict the object in the image in different poses; and
generate an offline trail for the one or more objects based on statistics associated with the one or more objects identified.

18. The at least one non-transitory computer-readable medium of claim 17, wherein the model is trained to perform a vector based search of a database for identifying the one or more objects, wherein the model comprises a machine learning based model created using training image data and one or more computer generated versions of the image of the one or more objects, wherein the one or more computer generated versions of the image comprise the multiple images that are generated from the image.

19. The at least one non-transitory computer-readable medium of claim 16, wherein identifying the one or more objects comprises generating, via the model, classification output comprising an object classification confidence, information identifying a location of the one or more objects within the image data, an indication of one or more object landmarks within the image data, and an indication of a sharpness of the detected one or more objects.

20. The system of claim 1, wherein detecting the one or more objects comprises generating classification output comprising an object classification confidence, information identifying a location of the one or more objects within the image data, an indication of one or more object landmarks within the image data, and an indication of a sharpness of the detected one or more objects.

\* \* \* \* \*